United States Patent [19]

Patterson et al.

[11] Patent Number: 5,183,582
[45] Date of Patent: Feb. 2, 1993

[54] BLOWING AGENT-CONTAINING POLYMERIC MDI COMPOSITIONS

[75] Inventors: Jimmy L. Patterson, Huron Township; Robert E. Riley, Flat Rock, both of Mich.

[73] Assignee: BASF Corporation, Parsippany, N.J.

[21] Appl. No.: 891,063

[22] Filed: Jun. 1, 1992

Related U.S. Application Data

[62] Division of Ser. No. 858,787, Mar. 27, 1992.

[51] Int. Cl.⁵ .............................. C09K 3/00; C08J 9/14
[52] U.S. Cl. ................................. 252/182.2; 521/131; 521/155
[58] Field of Search ............................. 521/131, 155; 252/182.2

[56] References Cited

U.S. PATENT DOCUMENTS

| | | | |
|---|---|---|---|
| 4,205,136 | 5/1980 | Ohashi et al. | 521/131 |
| 4,218,543 | 8/1980 | Weber et al. | 521/131 |
| 4,452,924 | 6/1984 | Radovich | 521/131 |
| 4,546,122 | 10/1985 | Radovich et al. | 521/131 |
| 4,713,399 | 12/1987 | Webb | 521/131 |
| 4,927,863 | 5/1990 | Bartlett et al. | 521/131 |
| 4,980,388 | 12/1990 | Herrington et al. | 521/131 |

*Primary Examiner*—Morton Foelak
*Attorney, Agent, or Firm*—William G. Conger

[57] ABSTRACT

Mixtures of medium viscosity polymeric MDI and HCFC-22 have unexpectedly low vapor pressure, rendering such mixtures suitable for the preparation of polyurethane and polyisocyanate foams.

5 Claims, No Drawings

BLOWING AGENT-CONTAINING POLYMERIC MDI COMPOSITIONS

This is a division of application Ser. No. 07/858,787 filed Mar. 27, 1992.

BACKGROUND OF THE INVENTION

1. Field of the Invention

The present invention pertains to isocyanate compositions containing blowing agents. More particularly, the subject invention pertains to compositions comprising medium viscosity polymeric methylenediphenylenediisocyanates (polymeric MDI) and monochlorodifluoromethane.

2. Description of the Related Art

Polymeric MDI is a valuable commodity whose largest commercial use is in the preparation of rigid polyurethane foams, particularly insulating foams for refrigerators, freezers, and roofing and siding laminate boards. At present, the majority of such rigid foams are blown with monochlorotrifluoromethane, refrigerant 11, a CFC which has come under increasing disfavor due to its ozone depletion potential. Monochlorodifluorometnane, an HCFC, has been proposed as a substitute for R-11, due to the fact that its ozone depletion potential is only c.a. 5% of R-11. However, R-22 is a gas at room temperature while R-11 is a liquid, and thus its use is problematic. Polyol mixtures containing R-22 develop considerable vapor pressure, for example, which can create problems when drums or tank cars are exposed to high temperatures. The atmospheric pressure solubility of HCFC-22 in polyester polyols and polyether polyols, for example, is only about 3 and 5 weight percent respectively.

One possible solution to this problem is to incorporate R-22 blowing agent in both the polyol component and isocyanate component of the polyurethane system. Unfortunately, the vapor pressure in the isocyanate component can still present a problem.

SUMMARY OF THE INVENTION

It has now been unexpectedly discovered that medium viscosity polymeric MDI will hold more R-22 in solution at a given pressure than polymeric MDI having lower or higher viscosities.

DESCRIPTION OF THE PREFERRED EMBODIMENTS

Polymeric MDI is prepared by the reaction of aniline with formaldehyde, followed by phosgenation and thermal cleavage into a crude mixture of isocyanates. By suitable selection of the aniline/formaldehyde ratio and the reaction conditions, the amount of two-ring versus higher ring-content analogues can be adjusted. The isocyanates prepared according to this process correspond to the formula:

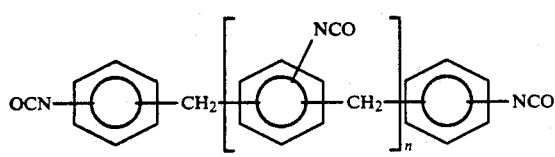

The content of higher ring-content analogues ($n>0$) determines to a great extent the viscosity of the mixture. Most frequently, the crude reaction mixture is subjected to partial distillation to remove the higher value two ring components. As a result of the distillation, the viscosity of the pot residue increases. The end result is the ability of the manufacturer to offer polymeric MDI with a range of viscosities and functionalities, which can be adjusted, if necessary by the addition of lower viscosity polymeric MDI, two-ring MDI, or higher viscosity polymeric MDI. The preparation of such polymeric MDI mixtures is well known to those skilled in the art.

As the viscosity of the polymeric MDI is determined essentially by the amount of higher ring "polymeric" species, one would expect that the solubility of gaseous blowing agent in polymeric MDI would be a function of viscosity, either steadily decreasing with higher 2-ring content (lower viscosity) or steadily increasing. However, it has unexpectedly been found that such is not the case, and that the solubility of HCFC-22 is much greater, at a given pressure, in medium viscosity polymeric MDI, i.e. MDI having a viscosity of from about 400 cps to about 1200 cps, preferably 600 cps to 1000 cps, than polymeric MDI having lower or higher viscosity. Thus medium viscosity polymeric MDI mixtures containing HCFC-22 are suitable for preparing polyurethane foams in processes where the use of otherwise similar mixtures containing lower or higher viscosity polymeric MDI would not be suitable due to equipment limitations or safety considerations, particularly in production where the isocyanate component is stored in drums or tanks incapable of withstanding more than modest pressure.

The medium viscosity polymeric MDI of the subject invention may further contain a minor portion, not to exceed about 30 percent by weight based on the weight of total isocyanate, preferably less than 20 percent by weight and most preferably less than 10 percent by weight of a modified two-ring MDI or modified polymeric MDI wherein the modified MDI or polymeric MDI contains urethane or carbodiimide linkages. Such modified isocyanates are available commercially as Lupranate TM MP-102, a urethane modified two-ring MDI, and Lupranate TM MM-103, a carbodiimide modified two-ring MDI. Other urethane modified MDI's based on polymeric MDI are also available.

The polyurethane foams prepared from the medium viscosity polymeric MDI/HCFC-22 mixtures are generally of the rigid type, with predominately closed cells, although open cell foams may be suitable for many applications, for example picnic coolers. These foams are prepared, as is well known to those skilled in the polyurethane art, by reacting a polyol component generally comprising polyether or polyester polyols with the isocyanate component, at isocyanate indexes of from 70 to 900, preferably 90 to 400. At indexes close to 100, the foam chemistry is such that the predominate linkages are urethane, while at significantly higher indexes, i.e. 200–900, the linkages are predominately isocyanurate. Polyisocyanurate foams have been particularly difficult to prepare with gaseous blowing agents, since the small amount of polyol component renders it highly difficult to include the necessary amount of blowing agent. With the medium viscosity polymeric MDI/HCFC-22 mixtures of the subject invention, such foams are possible using nearly conventional technology.

Further, the foam quality using medium viscosity polymeric MDI/HCFC-22 mixtures may be improved over that expected with higher or lower viscosity polymeric MDI's, particularly the latter, since upon exit from the mix head, the reaction mass, finding itself now at atmospheric pressure, tends to froth, often leading to large "bubbles" rather than fine cells. As the vapor pressure of HCFC-22 is lower in medium viscosity polymeric MDI at a given HCFC-22 weight percent concentration, these frothing problems can be minimized.

The invention will now be illustrated by the following examples. In the examples, HCFC-22 was metered into a stainless steel bomb having an internal volume of approximately 1 liter containing several stainless steel balls to allow for thorough mixing, and the amount of HCFC-22 added under pressure determined by weighing the bomb. The bomb, in addition to being equipped with an inlet value for HCFC-22 was also equipped with a connection for a pressure transducer. The bomb was evacuated prior to addition of HCFC-22, and thus the pressures measured are in pounds per square inch absolute (psia). In the first two trials, with medium and high viscosity polymeric MDI, the bomb was maintained at 75° F. after each HCFC-22 addition, and shaken several times over a period of approximately one half hour. The pressure was then measured. In trial 3, with low viscosity polymeric MDI, HCFC-22 was added at 2.3 weight percent, and the pressure after equilibration at several temperatures measured. The results are presented below.

TABLE 1

| Isocyanate | Weight percent HCFC-22 at Pressure (psia)[1] | | | | | |
|---|---|---|---|---|---|---|
| | 15 | 30 | 45 | 60 | 75 | 90 |
| Medium Viscosity[2] | 5.0 | 6.6 | 8.0 | 9.5 | 11.1 | 12.7 |
| High Viscosity[3] | <2.5 | 4.0 | 5.7 | 7.2 | — | — |

[1]Values interpolated from a plot of pressure versus weight percent.
[2]Lupranate TM M70L, a polymeric MDI having a nominal viscosity of 700 cps.
[3]Lupranate TM M200, a polymeric MDI having a nominal viscosity of 2000.

In trial 3, at 2.3 weight percent HCFC-22 concentration in a low viscosity polymeric MDI having a nominal viscosity of 200 cps (Lupranate TM M20S), the pressures (psia) at various temperatures are given below.

TABLE 2

| Temperature (°C.) | Pressure (psia) |
|---|---|
| 21 | 27.4 |
| 42 | 48.5 |
| 60 | 67.7 |

Thus, at only 2.3 weight percent HCFC-22, the pressure at 21° C. (70° F.) is 27.4 psia, while with medium viscosity polymeric MDI at 75° F. 5° F. higher the weight percent of HCFC-22 at 27.4 psia is approximately 6.5 weight percent, approximately 300 percent higher.

What is claimed is:

1. A composition comprising medium viscosity polymeric MDI methylenediphenylenediisocyanate having a viscosity of from 400 to 1200 centipoise when measured at 25° C., and monochlorodifluoromethane.

2. The composition of claim 1 wherein said medium viscosity polymeric methylenediphenylenediisocyante has a viscosity of from 600 to 1000 centipoise when measured at 25° C.

3. The composition of claim 1 wherein said monochlorodifluoromethane is present in an amount of from 4 weight percent to about 12 weight percent based on the total composition.

4. The composition of claim 2 wherein said monochlorodifluoromethane is present in an amount of from 4 weight percent to about 12 weight percent based on the total composition.

5. The composition of claim 1, further comprising a minor quantity, not to exceed 30 percent by weight of total isocyanate of a modified tow-ring methylenediphenylenediisocyanode or modified polymeric methlenediphenylenediisocyanode wherein said modified methylenediphenylenediisocyanate or polymeric methylenediphenylenediisocyanate contains urethane or carbodiimide linkages.

* * * * *